Jan. 15, 1929. Re. 17,192
H. C. MILLER
LOOSE LEAF BINDER
Original Filed June 29, 1925
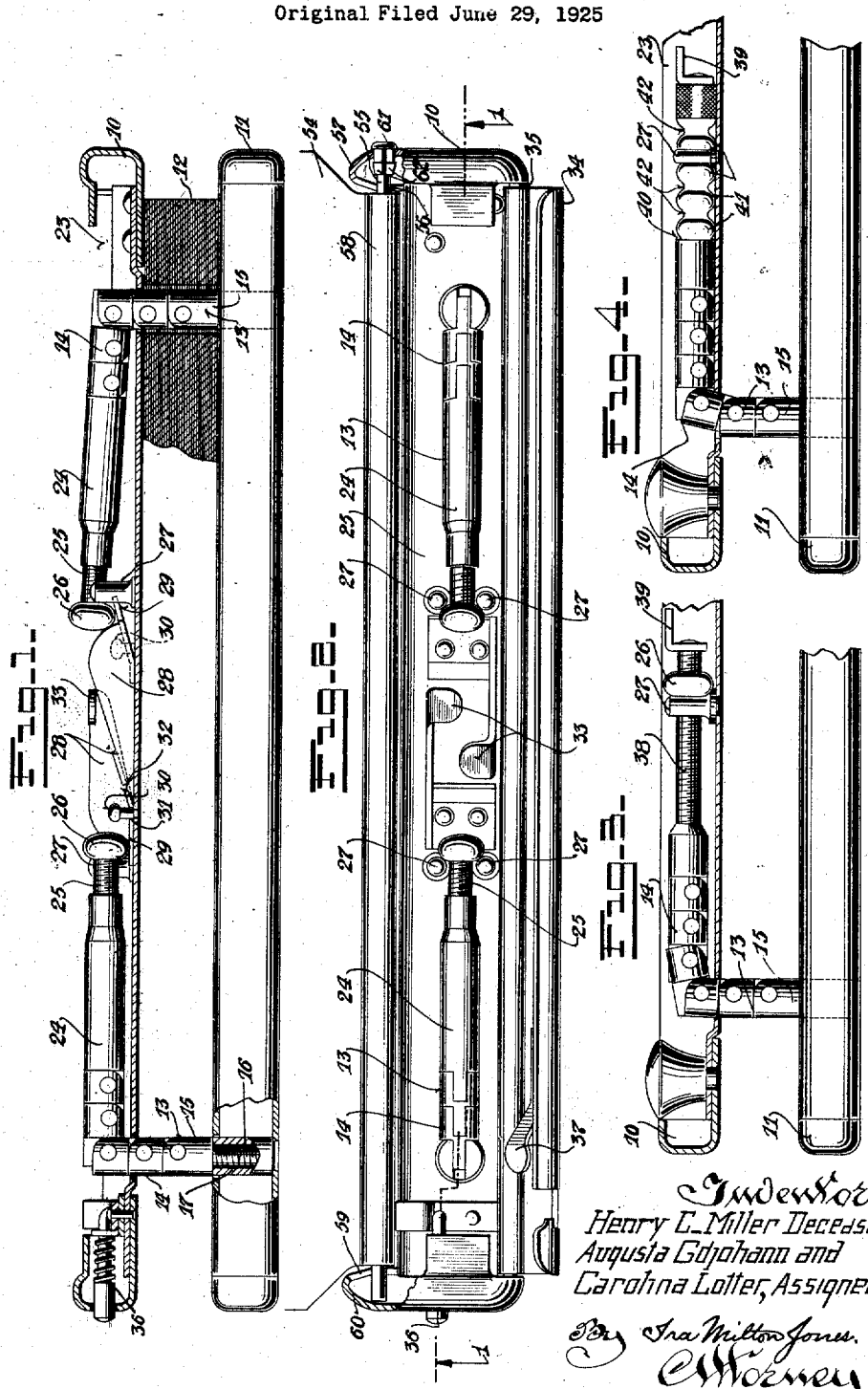
Inventor
Henry C. Miller Deceased,
Augusta Gotohann and
Carolina Lotter, Assignees.
By Ira Milton Jones.
Attorney Reissued Jan. 15, 1929. Re. 17,192

UNITED STATES PATENT OFFICE.

HENRY C. MILLER, DECEASED, LATE OF MILWAUKEE, WISCONSIN, BY AUGUSTA GILJOHANN AND CAROLINA LOTTER, ASSIGNEES, BOTH OF MILWAUKEE, WISCONSIN.

LOOSE-LEAF BINDER.

Original No. 1,639,305, dated August 16, 1927, Serial No. 40,312, filed June 29, 1925. Application for reissue filed March 5, 1928. Serial No. 259,302.

This invention relates to certain new and useful improvements in loose-leaf binders and has as an object the provision of an improved and simplified binder which will permit the ready locking and releasing of the connection between the heads thereof.

Another object of this invention resides in the provision of an improved loose-leaf binder in which a ball or oval shaped enlargement forms a cam for readily releasably connecting the free end portions of the posts with one of the binder heads to clamp the leaves between the heads.

It is a further object of this invention to provide an improved loose-leaf binder having means for permitting the ready, fine adjustment of the post lengths in order to accommodate minor increases or decreases in the number of sheets within the binder.

A further object of this invention resides in the provision of an improved means for facilitating the quick and ready release of the connection between the posts and the binder head in which the same are extensible.

And a still further object of this invention resides in the provision of an improved means for readily securing the pivot for the loose-leaf binder covers in position whereby the labor incident to the mounting of the same is materially reduced and the accidental dislodgement of the pivot prevented.

With the above and other objects in view which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, there are illustrated several complete examples of the physical embodiment of the invention constructed according to the best modes so far devised for the practical application of the principles thereof, and in which:

Figure 1 is a view looking at the rear of a loose-leaf binder embodying the invention, parts thereof being broken away and in section to more clearly illustrate structural details and said view being taken through Figure 2 on the plane of the line 1—1;

Figure 2 is a top plan view of the upper binder head, the eye glass case cover therefor being in open position;

Figure 3 is a fragmentary view looking at the rear of a slightly modified type of loose-leaf binder embodying the invention, parts thereof being in section and parts in elevations, and Figure 4 is a view similar to Figure 3 of still another modified form of the invention.

Referring now more particularly to the accompanying drawings, in which like numerals designate like parts throughout the several views, the numerals 10 and 11 designate, respectively, upper and lower binder heads between which a body of leaves 12 is adapted to be clamped. The heads are connectible by one or more binder posts 13 adapted to be so operated as to readily releasably clamp the body of leaves therebetween.

Each post 13 has the major portion of its length formed of pivotally connected links 14 and a threaded stud 16 extends from the lower-most link 15, which is directly threaded in a socket 17 connected with the lower binder head.

With special reference to Figures 1 and 2, the outer-most link 14 of each post has an internally threaded socket 24 connected therewith in the threaded end of which a stud 25 is adjustable. The outer ends of the studs have approximate ball shaped or round enlargements 26 thereon adapted to be engaged or sprung behind pairs of pins 27 fixed in the channel of the upper head. The pins of each pair are spaced sidewise a distance sufficient to permit the stud 25 to be positioned therebetween.

When it is desired to clamp a body of leaves in the binder, the upper head is moved downwardly to press against the leaves and the free end portions of the posts extended about the head are swung inwardly into the upper head channel 23 to lock the head against retraction. The studs 25 are threaded into the sockets 24 so that when the head is pressed against the leaves, the innermost portions of the enlargements 26 register with the post or pins 27 and application of pressure on the enlargements cause them to spring behind the pins and thus frictionally hold the posts under tension. This springing of the enlargements behind the pins under a tension is facilitated by rounding or tapering the ends of the pins 27 as clearly illustrated in Figure 1.

The enlargements 26 being rounded makes it difficult to detach them from behind the pins 27 and there is provided improved lever devices secured adjacent the free ends of the posts and each consisting of a lever 28 having its inner end formed with a transverse part 29 providing a pry which is engageable under the adjacent enlargement 26. The levers are secured in position by one or more studs or rivets 30 carried by the binder head and passed through relatively large openings 31 in the levers outwardly of that portion of the transverse portions 29 engageable under the adjacent enlargement. The transverse portions inwardly of the rivets 30 are slightly curved upwardly, as at 32, to form fulcrums on which the levers 28 rock when pressure is applied on to the finger engaging ends 33 thereof. As the enlargements 26 are sprung behind the pins 27, they depress the ends 29 of the levers and raise the finger engaging ends 33 thereof so that when it is desired to release the tension on the leaves 12, pressure is applied to the finger engaging portions 33 pivoting the levers on the fulcrums 29 and lifting the enlargements out of contact with the pins 27. The posts are then straightened and the upper head raised out of contact with the leaves.

If desired the channel of the upper binder head may be enclosed by what is termed in the art as an eye-glass case cover 34 which is pivotally mounted, as at 35, and adapted to be releasably secured in a closed position by a latch 36, a spring 37 normally opening urging the cover to open position.

In Figure 3 a slightly modified form of the invention is illustrated in which the enlargements 26 are internally threaded and adjustable on elongated threaded studs 38 carried by the outer-most post links in lieu of the sockets 24. With this construction, minor adjustments are obtained by turning the enlargement on the stud 38. In place of the levers 28, angular finger clips 39 are carried by the free ends of the studs 38 to facilitate the ready disengagement of the enlargements from behind the pins 27. As the operation of this form of my invention is identical with that illustrated in Figures 1 and 2, further detailed description is deemed unnecessary.

Figure 4 also discloses another modification of my invention in which the outer-most links of the posts carry studs 40 on which a plurality of ball-shaped or spherical enlargements 41, similar to the enlargements 26, are formed, the adjustments being obtained by engaging any one of the enlargements 41 behinds the pins 27 and the spaces between the enlargements forming recesses 42 in which the pins 27 are engageable.

As is customary in loose-leaf binders, a cover 54 is carried by each binder head to protect the leaves 12 and in Figure 2 is illustrated a novel and improved means for mounting the cover which consists of a pivot rod 55 adapted to be inserted through an opening 56 in the lug extension 57 at one end of the upper binder head, through an opening in the inner end 58 of the cover and into a recess 59 in the inner wall or face of the lug 60 at the other end of the upper head. The lugs 57 and 60 are hollow and the opening 56 extends through both walls of the lug 57 whereas the outer wall of the lug 60 being imperforated, limits the movement thereto-ward of the pin 50. A cap 61 which may be of the snap button type closes the outer end of the opening 56 of the lug 57, the spring lugs 62 thereof springing behind the outer wall of said lug to prevent longitudinal shifting of the rod, and consequently, secure the same in position.

This manner of mounting the covers effects a material saving in labor as the time required for assembling is greatly reduced. The spring clips 61 also form a neater and more secure mounting for the covers.

What is claimed is:

1. A loose-leaf binder, comprising a pair of binder heads, a flexible post adapted to adjustably connect the heads, one end of the post being secured to one head and its other end portion being free and extensibly passed through the second head and extended thereover at right angles to its portion extended between the heads, an enlargement carried by the free end portion of the post, and a stop fixed to the second head and behind which the post enlargement is lockingly engageable to prevent the retraction of the post.

2. A loose leaf binder, comprising a pair of binder heads, a flexible post adapted to adjustably connect the heads, one end of the post being secured to one head and its other end portion being free and extensibly passed through the second head, an enlargement carried by the free end portions of the post, stationary means carried by the second head and behind which the post enlargement is adapted to be sprung to lockingly connect the post and said second head, and means for adjusting the distance between the enlargement and the first head to compensate for increases and decreases in the number of sheets confined between the heads.

3. A loose-leaf binder, comprising a pair of binder heads, a post adapted to adjustably connect the heads, one end of the post being secured to one head and its other end portion being free and extensibly passed through the second head, an enlargement carried by the free end portion of the post, and a pair of pins carried by the second head and between which the post free end portion is movable to lockingly engage the enlargement therebehind.

4. A loose leaf binder, comprising a pair of binder heads, a flexible post adapted to adjustably connect the heads, one end of the post being secured to one head and its other end portion being free and extensibly passed through the second head, a substantially spherical enlargement carried by the free end portion of the post, and means carried by the second head and behind which the post enlargement is adapted to be sprung to lockingly connect the post and said second head, said enlargement having an adjustable threaded connection with the post whereby the same may be set to regulate the distance between it and the first binder head to adjust the capacity of the binder to a fine degree.

5. A loose leaf binder, comprising a pair of heads, a flexible post adapted to adjustably connect the heads, said post having one end secured to the first head and its other end portion free and extensibly passed through the second head, a threaded stud carried by the free end portion of the post, an enlargement carried by the threaded stud, said threaded stud permitting adjustment of the enlargement to vary the distance between it and the first binder head, and means carried by the second binder and behind which the enlargement is adapted to be snapped to connect the post with the second head.

6. A loose-leaf binder, comprising a pair of binder heads, a flexible post adapted to adjustably connect the heads, said post having one end secured to one head and its other end portion free and extensibly passed through the second head, an internally threaded socket carried by the free end portion of the post, a stud adjustably threaded in the socket, an enlargement formed on the stud, and means carried by the second head and behind which said enlargement is adapted to be sprung to releasably connect the post therewith.

7. A loose-leaf binder, comprising a pair of binder heads, a flexible post adapted to adjustably connect the heads, one end of the post being secured to one head and its other end portion being free and extensibly passed through the second head, an enlargement carried by the free end portion of the post, means carried by the second head and behind which the post enlargement is adapted to be sprung to lockingly connect the post and said second head, and means engageable with the enlargement to facilitate its quick detachment from the head carried means.

8. A loose-leaf binder, comprising a pair of binder heads, a post adapted to adjustably connect the heads, one end of the post being connected with one head and its other end portion being free and extensibly passed through the second head, an enlargement carried by the post free end portion, a part fixed to the second head and behind which said enlargement is adapted to be sprung to releasably connect the post therewith, a lever pivotally mounted in the second binder head adjacent the part fixed thereto, and a part carried by the lever and adapted to be confined beneath the enlargement when in locked position whereby movement of the lever on its pivot disengages the same from behind the binder head carried part.

9. In a device of the character described, a support having a pair of spaced lugs, one lug having an aperture extending transversely therethrough and the other lug having a transverse recess in its inner face in axial alignment with the aperture of the other lug, a cover having a part adapted to be inserted between the lugs and provided with an opening registering with the aperture and recess in the lugs, a pivot rod adapted to be passed through the opening of the first-mentioned lug, through the opening in the cover and into the recess of the second lug, said rod being of a length so that when one end is abutting the closed end of the recess in the second lug its other end is adjacent the outer end of the opening in the first lug, and a bored snap fastener adapted to be inserted over the end of the rod in the first lug and having means engageable with the first lug to prevent its detachment.

10. In a loose leaf binder including a binder head having end cap members provided with forwardly projecting hollow lugs between which the inner end of a cover member is adapted to be pivoted, said cover member having a transverse opening in its inner end portion adapted to register with apertures in both walls of one lug and in the inner wall of the other lug, a pivot rod adapted to be inserted through the apertures of the first lug and through the opening of the cover member to have one end extend into the other lug aperture to abut the outer unapertured wall thereof, the other end of the rod being disposed within the first lug, a cap member adapted to be inserted in the aperture in the outer wall of the first lug, and spring means carried by the cap member and engaging the inner surface of the outer wall of the first lug about its aperture to prevent detachment of the cap member and axial movement of the rod and the consequent disengagement of the cover member from the binder head.

11. In a loose leaf binder or the like including a support having a pair of sidewise spaced lugs provided with transverse apertures arranged in axial alignment, a cover member having a part adapted to be received between the lugs and provided with an opening registering with the lug apertures and a pivot rod adapted to be passed through the cover opening with its ends disposed in the apertures of the lugs, means preventing axial movement of the rod and the consequent disconnection of the cover member from the support and including a member adapted to be inserted in the outer end of one lug aperture and yieldable means carried by the member and interlocking with said lug to prevent the detachment of the member from the lug and the consequent axial movement of the rod through the aperture thereof.

12. In a loose leaf binder including a support having a pair of sidewise spaced lugs provided with axially aligned transverse apertures, a cover member having a part received between the lugs and provided with an opening registered with the apertures thereof and a pivot rod passed through the cover opening with its ends disposed in the lug apertures, means preventing axial movement of the rod and the consequent disconnection of the cover from the support and including spring means interlocked with one lug aperture to prevent the axial movement of the rod outwardly therethrough.

In testimony whereof we have hereunto affixed our signatures.

AUGUSTA GILJOHANN,
CAROLINA LOTTER,
*Assignees of Henry C. Miller, Deceased.*